United States Patent [19]

Coller

[11] Patent Number: 5,735,940
[45] Date of Patent: Apr. 7, 1998

[54] MARKING COMPOSITION

[76] Inventor: Miriam Coller, 84-05 Avon St., Jamaica, N.Y. 11432

[21] Appl. No.: 685,396

[22] Filed: Jul. 23, 1996

Related U.S. Application Data

[63] Continuation-in-part of Ser. No. 534,062, Sep. 26, 1995, abandoned, which is a continuation-in-part of Ser. No. 311,547, Sep. 23, 1994, abandoned.

[51] Int. Cl.⁶ ..................................... C09D 11/00
[52] U.S. Cl. .................. 106/31.01; 106/31.94; 106/31.32; 106/31.64
[58] Field of Search ................ 106/19 R, 19 C, 106/19 A, 31.01, 31.94, 31.32, 31.64

[56] References Cited

U.S. PATENT DOCUMENTS

| | | | |
|---|---|---|---|
| 2,416,103 | 2/1947 | Lampton et al. | 244/134 |
| 2,716,615 | 8/1955 | Voris | 106/189 |
| 2,731,353 | 1/1956 | Fain et al. | 106/13 |
| 2,783,209 | 2/1957 | Pessel | 252/301.3 |
| 3,048,464 | 8/1962 | Fisher | 8/79 |
| 3,068,111 | 12/1962 | Seymour | 106/177 |
| 3,093,603 | 6/1963 | Gilchrist | 260/17 |
| 3,170,438 | 2/1965 | Nadler et al. | 116/124 |
| 3,263,012 | 7/1966 | Nadler et al. | 264/234 |
| 3,288,618 | 11/1966 | De Vries | 106/148 |
| 3,297,585 | 1/1967 | Hayden | 252/408 |
| 3,300,325 | 1/1967 | Lindquist | 106/195 |
| 3,496,906 | 2/1970 | Gerke | 116/124 |
| 3,652,313 | 3/1972 | Nagata et al. | 106/500 |
| 3,854,958 | 12/1974 | Samacke et al. | 106/14 |
| 3,899,439 | 8/1975 | Mahlman | 252/311 |
| 4,056,402 | 11/1977 | Guzi, Jr. | 106/500 |
| 4,364,994 | 12/1982 | Fogelberg | 428/316.6 |
| 4,792,357 | 12/1988 | Bier | 106/83 |
| 5,165,966 | 11/1992 | Adams | 427/256 |
| 5,397,387 | 3/1995 | Deng et al. | 106/19 C |

*Primary Examiner*—Helene Klemanski
*Attorney, Agent, or Firm*—Stephen E. Feldman

[57] ABSTRACT

Temporary marking compositions for producing colors upon contact with a surface, especially one covered in snow or ice, are disclosed. The compositions contain a water-soluble salt or a mixture of water-soluble salts, one or more colorants and water. The compositions may include a stabilizer, an extender, additional antifreezes, surfactants or emulsifiers, anti-bacterial/anti-fungus agents, flourescents and other ingredients. The compositions may contain only antifreezes such as alcohol, glycerol and propylene glycol, polyol fatty acid esters, their derivatives, or combinations of the salts and/or the other antifreezes. The methods of marking are disclosed.

20 Claims, No Drawings

MARKING COMPOSITION

This application is a continuation-in-part of application Ser. No. 08/534,062 filed Sep. 26, 1995, which is a CIP of Ser. No. 08/311,547 filed Sep. 23, 1994, both now abandoned.

FIELD OF THE INVENTION

The invention relates to compositions for producing temporary washable colored markings on surfaces, especially outdoors in subfreezing temperatures and for marking snow or ice.

BACKGROUND OF THE INVENTION

A number of marking compositions are used for various purposes.

U.S. Pat. No. 3,288,618 (DeVries) relates to a colored reflective coating composition.

U.S. Pat. No. 2,371,353 (Fain) relates to a de-icing composition applied as coating to aircraft parts. The composition is formed of lithium chloride combined with potassium chromate, carboxymethyl cellulose and a wetting agent. The wetting agent can be Triton X-100 which is an alkylated aryl polyether alcohol such as iso-octylphenyl ether of polyethylene glycol.

U.S. Pat. No. 2,416,103 (Lampton et al.) discloses a de-icing paint or coating which is applied to aircraft parts or accessories such as propellers, rotors, wings, etc. The composition comprises a resin, a wetting agent, a freezing point depressing material. A wetting agent is selected from the group consisting of salts of sulphated alcohols and salts of sulphated acids, salts of sulphated fatty acid amides, salts of sulphated fatty acids esters. The freeze depressant may be barium thiocyanate or other salts such as sodium chloride and calcium chloride.

U.S. Pat. No. 2,783,209 (Pessel) relates to a marine marking composition comprising a glue and light colored finely divided solid material such as polyalkylene glycol, methyl cellulose, polyvinyl alcohol.

U.S. Pat. No. 3,297,585 (Hayden) discloses a visual indicator comprising aqueous solution of a fluorescent and an alcohol soluble basic dye dissolved in a mixture of glacial acetic acid, ethanol, glycerine and propionic acid.

Most known marker composition include flammable and/ or toxic and/or environmentally suspect chemicals. Therefore, these compositions present certain dangers. Because the Environmental Protection Agency restricts the use of toxic chemicals in coating compositions a number of water based paints have been created to replace the flammable and/or toxic coating compositions.

For example, U.S. Pat. No. 4,792,357 (Bier) discloses a permanent water-based paint comprising considerable amount of ingredients such as water-soluble salts in concentration of at or above 10% (weight/volume) and a pigment in the amount of at least 5% by weight. A filler is present in the paint composition in the amount of from about 20% to about 70% by weight. This paint is used only for interior painting of buildings, especially ceilings. The composition can not be used for temporary marking surfaces and can not be used on snow and ice. The formulation includes a great amount of talc as a filler. The talc is used to create a thick, smooth mixture which spreads evenly, covers the substrate in one or two coats and dries to a permanent, washable covering.

U.S. Pat. No. 5,165,966 (Adams) relates to a process of painting snow with a biodegradable solution of a food coloring and a gelling agent such as household gelatin. However, the paint lies only on the top of the snow. Warm water is required to mix with dry ingredients. The paint contains no antifreeze. It is not clear how long it will disperse if left in the cold.

OBJECTS OF THE INVENTION

It is an object of the invention to provide compositions which are non-toxic, environmentally acceptable and easily washable for temporary coating of snow or ice and other surfaces such as for trail marking, sports field marking, hazard marking and for decorating outdoor surfaces, particularly snow and ice.

It is another object of the invention to create a water-based temporary covering solution which can be utilized and kept outdoors indefinitely at low temperatures.

It is a further object of the invention to develop a product that provides a quality marking and excludes or limits the "bleeding" effect of a colorant on snow, ice and surfaces such as sand.

It is still another object of the invention to provide a covering composition which can be washed off surfaces by rain and disappear with snow and ice as they melt and will disperse in water.

It is also another object of the invention to create a composition which washes from most fabrics.

It is a further object of the invention to improve the washability of the produced coating from cement, brick, stone and similar surfaces.

It is yet further object of the invention to lower the cost of a marking composition.

SUMMARY OF THE INVENTION

The invention relates to marking compositions. The compositions are mixtures of ingredients including at least water, one or more anti-freeze agents and one or more water soluble colors. The compositions may include a stabilizer and/or an extender. The stabilizer produces an even coating of color. It may also be necessary to add a stabilizer when two colorants are combined together to improve color quality. The extender controls the melting effect of certain anti-freezes and thereby the bleeding of the colorant on snow or ice.

The markings on the ground or other surfaces will be washed away with melting snow or falling rain. The ingredients can be dissolved in water or other liquids. The composition may include specific agents such as additional surfactant agents or emulsifiers, PH neutralizers, antifreezes, antibacterial/fungus agents, additional stabilizers and additional extenders such as chalk, colored chalk, talc or clay for controlling the quality of the marking and the melting effect of the anti-freeze and additional compounds. Extenders may also enlighten the color.

A marking composition comprises:

a) A salt selected from the group comprising sodium chloride, potassium chloride, magnesium chloride and calcium chloride, sodium sulfite and taken in the amounts from about 1% to about 25%. Combinations of the above salts may also be used and their amounts can vary.

b) A stabilizer in the amount up to about 3%. Various compounds can be used as a stabilizer.

c) Extender in the amount up to about 3%.

d) Colors in the amount from about 0.01% to about 3%.

e) Water in the amount that adds to 100%.

The marking compositions may comprise the ingredients a), d) and e) only.

Such a marking composition may include other antifreeze agents added to the above described ingredients or substituted for the salts.

The marking composition may only include an antifreeze or mixture of antifreeze agents, a colorant, a stabilizer, a surfactant agent or emulsifier and an extender.

Such a method of marking incudes selecting a surface for marking and applying to the surface aqueous marking compositions comprising one or more water soluble salts or mixture of water soluble salts, one or more colorants, one or more surfactants or emulsifiers, one or more stabilizers, one or more extenders and other ingredients.

DETAILED DESCRIPTION OF THE INVENTION

The marking compositions of the invention can be prepared by dissolving water soluble salts such as sodium chloride, potassium chloride, magnesium chloride, sodium sulfite and calcium chloride in water. A solution with 21% by weight of sodium chloride is necessary to lower the freezing point to 0° Fahrenheit. A sealed 8 oz. container of the composition does not require toxicity labeling under ASTM-D4236 standards, is non-flammable and is soluble. If magnesium chloride is used in the amount of about 21% by weight the composition can be used at minus 23° Fahrenheit. Calcium chloride in the amount of 25% by weight reduces the temperature of the solution to −20° Fahrenheit.

Each of the salts can be combined with each of the others or with other antifreeze agents. For example, 10% by weight magnesium chloride and 15% by weight sodium chloride or 10% by weight calcium chloride and 23% by weight sodium chloride will each reduce the freezing temperature of the solution to −20° Fahrenheit. A combination of 20% by weight glycerol and 20% by weight sodium chloride in the solution reduces the freezing point to −10° Fahrenheit.

A solution of a salt in water and color may be used when the quality of marking is not at issue. A stabilizer and/or an extender can be added to improve the quality of the marking.

A number of stabilizers including known stabilizers can be used. Such stabilizers may be either water-soluble or water-dispersible.

The water-soluble stabilizers may be cellulose derivatives such as cellulose ether ("Klucel"), ethyl hydroxyethylcellulose, ethyl methylcellulose, hydroxyethylcellullose, hydroxypropyl cellulose, hydroxyethyl methylcellulose, hydroxipropyl methylcellulose, methylcellulose, sodium carboxymethylcellulose, sodium carboxymethyl hydroxyethylcellulose, or sodium cellulose sulfate, silicones, acrylates such as polyacrylic acid salts, polyacylamide, acrylamide copolymers; carboxyvinyl polymer ("Carbopol"); glycerine, polyethylene glycols; polyethylene oxide; polyvinyl alcohol; polyvinyl methyl ether; polyvinylpyrrolidone; exudates from vegetation such as gum arabic, gum karaya, gum tragacanth; seed extractives such as guar gum, locust bean gum, starch, starch gum such as dextrin, starch derivatives, proteins (soy); seaweed products such as agar—agar, alginates, Irish moss; animal products such as casein; tamarind gum; xanthan gum; gum ghatti; or water-soluble silicates. Such stabilizers may be used in amounts preferably of up to 3% by weight of the solution.

Water-dispersable stabilizers may also be used. Examples thereof are drying oils such as wood oil, treated fish oil, linseed oil, rapeseed oil, tall oil, etc.; resins such as dispersible alkyd resins, tall oil alkyd resins, cottonseed alkydes, polymer dispersions, such as polyvinyl acetate and polyvinyl propionate dispersions, acrylic and metacrylic resin dispersions and copolymers thereof, polystyrene dispersions, etc. Such stabilizers may be used in amounts preferably up to 3% by weight of the solution.

A preferred stabilizer is hydroxypropyl cellulose (HPC). The HPC acts as a thickening agent and assists in creating uniform color and in holding color combinations together. When HPC is used in the amount of above about 0.5% an adverse effect on the solution is observed. The stabilizer can be removed in applications where the coloring quality is irrelevant and where no color combinations, e.g. red and blue to make purple, are necessary.

Extenders known in the art such as kaolin, starches, for example corn starch, dextrin, flour, talc, chalk or clay or others can be used generally in an amount from about 0.25% to about 3% by weight of the marking composition. The preferred ones are talc, chalk or clay. The most preferred extender is talc. Talc minimizes the "spreading" or bleeding effect that occurs when combinations of salts such as sodium chloride and FD&C colorant are used.

The extender selected from the group consisting of talc, chalk, kaolin, starch and clay acts to impede the effects of penetrating and spreading of the solution into snow or ice when a salt is used as antifreeze. For decorative and precise marking, especially on snow, it is necessary to prevent undue bleeding on snow surfaces or excessive penetration of color into the snow. The extender can also act as an enlightener. For other applications talc or other extenders can be excluded from the compositions.

A colorant may be FD&C water soluble dyes, water-insoluble dyes, fluorescents and other types of colorants.

The colors may be used alone or in combination with other colors.

Several colors have been developed using colorants chosen primarily from the FD&C color list primarily for use with a solution comprising NaCl as the principal antifreeze agents. Other colorants such as azo dyes can be also used. Some of these colorants are not soluble in water, but are soluble in alcohol or other liquid antifreeze agents. Red and yellow colors are used to make orange or red. Blue and red colors are used to create purple. A basic color is: red-FD&C Red #3, or Cochineal Red, or a combination thereof—50% of each of the two colors or 40% Red #3 and 60% Cochineal. The FD&C Red #3 is less costly than Cochineal, but Cochineal is more readily washable from cement or other similar surfaces. FD&C Red #40 is not readily usable with sodium chloride to make red color. NaCl causes FD&C Red #40 to become brown. It browns even more in freezing conditions. The other basic colors are blue—FD&C Blue #1 and FD&C Blue #2; yellow—Yellow #5 and/or #6; green—a mixture of Yellow #5 and Green #3. Orange is made with a mixture of Yellow #5 and Red #3; purple is a mixture of Red #3 and Blue #1. Other colors from the FD&C list can be used as well as mixtures of colors. Pastels can be created by reducing the concentration of color. Fluorescence can also be created. For example, FD&C Red #3 contains fluorescent components. The choices and concentrations of colors can be adjusted to meet ASTM-D4236 standards for no toxicity warnings.

The most effective in the sense of washability from cement and similar surfaces is a sodium chloride solution which includes the following colors or combinations of the following colors:

Red—Combinations of Cochineal Red A.P. and FD&C Red #3; combinations of FD&C Red #3 and FD&C Yellow #6; FD&C Red #4 alone or FD&C #3.

Blue—FD&C Blue #2 or FD&C Blue #2 with a small amount of FD&C Green #3 (about 0.02% out of 0.3%).

Green—a small amount of FD&C Green #3 (about 0.02%) used in combination with D&C Yellow #10; and combinations using FD&C Yellow #5.

Brown—FD&C Red #40 for Salt Solutions.

Yellow—D&C Yellow #10 can be used alone or combined with small amounts of FD&C Yellow #6 or FD&C Yellow #5. FD&C Yellow #5 alone (up to about 0.23%) or combined with small amounts of D&C Yellow #10 or with small amounts of FD&C Yellow #6 can be used for sealed containers.

Purple—among other versions—FD&C Blue #2 and FD&C Red #3 combined at about 3 to 1 for deep purple and at about 2 to 1 for light purple.

Orange—FD&C Yellow #6 is just one possibility.

FD&C Blue #1 is not particularly washable from cement or similar surfaces. Small amounts of FD&C Green #3 and about 0.15% Red #3 may be used particularly in salt solutions. These are good colors visually. FD&C Blue #1 is also quite reasonably prices. Washability is improved by adding surfactants.

Known antifreeze agents can be used. Antifreeze agents such as alcohols, polyols such as glycerol, glycols such as propylene glycol and polyol fatty acid esters, or their derivatives are preferable compounds. A preferred antifreeze is glycerol. Alcohols, including denatured alcohols such as ethanol are usually taken in the amounts of from about 23% to about 40% by weight to lower the freezing point of the solution to 0° Fahrenheit or −20° Fahrenheit respectively. These other antifreezes may be used in lesser amounts when combined with a water-soluble salt such as sodium chloride, calcium chloride or magnesium chloride and other compounds, for example, surfactants. When alcohol is used, an anti-bacterial anti-fungus agent such as sodium benzoate can be added to the formulation. These antifreezes have an ability to lower the freezing point of the solution well below minus 6° Fahrenheit, the lower limit for sodium chloride. For example, a combination of 20% by weight glycerol and 20% by weight sodium chloride in the solution reduces the freezing point to −10° Fahrenheit. 47% by weight of propylene glycol solution allows one to achieve freezing point −20° Fahrenheit.

The non-salt antifreeze solutions allow the FD&C Red #40 to retain its red color. A color, stabilizer and sodium benzoate can also be added. An alcohol containing solution etches the color into snow and limits bleeding even without any extender. Because the antifreezes do not have the same melting effect as salts it is possible to eliminate the extender. While the extender can be unnecessary in a non-salt solution it may be still desirable as enlightener.

The marking composition may contain one or more surfactant. Surfactants improve washability of coating from various surfaces such as cement. The presence of surfactants allows the use of certain colors which have less than optimal washability from these surfaces. In some cases salt and/or antifreeze combinations cause more color adhesion to surfaces. The choice of appropriate surfactants or emulsifiers or detergents can relieve this problem. Known in the art surfactants, emulsifiers or mixtures thereof can be utilized. Nonionic and anionic biodegradeble surfactants are preferred. Surfactants can be taken in the amounts from about 0.01% to about 10%. Examples of these surfactants are: polyethylene oxides, sodium lauryl sulfate, cetyl pyridinium chloride, lecithin, alkyl sulphates, alkyl sulphanates, alkyl sulphonates, polyoxyalkylene surfactants, etc. Examples of anionic surfactants are follows:

Sulfated vegetable (castor) oils, trade name Actrasol C75, Manufactured by Climax Performance Materials Corp;

Sodium lauryl sulfate, trade name Duponol ME Dry, Manufactured by Witco Corp;

Sodium dioctyl sulfosuccinate, trade name Pentex 99, manufactured by Rhone - Poulenc Co.;

Sodium dibutyl naphtalene sulfonate, trade name Rhodacal BX-78; manufactured by Rhone - Poulenc Co.

Disodium alkyldiphenyl-oxide sulfonate, trade name Rhodacal DSB; manufactured by Phone - Poulenc Co.

An example of non-ionic surfactant is a mixture of 60–100% by weight of fatty acid polyoxyethylene glycol and 0.5–1.0% by weight of isopropyl alcohol, trade name Aconol X-10; manufactured by Huntsman Corporation Canada, Inc.

ACONOL X-10 is an extremely versatile emulsifying agent. Its nonionic character makes it compatible with both anionic and cationic compounds, stable in, moderate concentrations of acid or alkali and tolerant of a varying water hardness.

A surfactant such as Rhodapex ES manufactured by Rhona-Poulenc Co. can be used.

Ivory Liquid Soap and Season Dish Detergent are effect with a salt solution and safe.

Ivory Liquid Soap is composed for the following ingredients: water, sodium laureth, sulfate, sodium lauryl sulfate, lauramide DEA, sodium sulfate, cocamidopropyl betaine, sodium chloride, styrene/acrylate copolymer, octoxynol-9, DHDM hydrantoin, tetrasodium, EDTA, citric acid; manufactured by Procter & Gamble Co;

Season Dish Detergent is a mixture of non-ionic and anionic surfactants distributed by Season Products Corp.

Some of the surfactants have antifreeze and/or stabilizing properties and this might cause reduction or even elimination of the need for other antifreezes or stabilizers. Surfactants may also be used to modify the appearance of the color on a surface. In these cases surfactants in amounts in excess of 4% may be used.

Some additional compounds such as silicates, silicone, phosphates, pH neutralizers, polymers, gelling agents, pigments, polysaccharides, colloids, fatty acids and other compounds can be added to marking compositions. For example, pH neutralizers can be helpful in removing colors such as FD&C Blue #1: disodium salt of 4-((4-(N-ethyl-p-sulfobenzylamino)-phenyl)-(2-sulfoniumphenyl)-methylene)-(1-(N-ethyl-N-p-sulfobenzyl)-sup2, 5-cyclohexadienimine), FD&C Green #3: Disodium salt of 4-((4-(N-ethyl-p-sulfobenzylamino)-phenyl-(4-hydroxy-2-sulfobenzyl)-sup2,3-cyclohexadienimine), FD&C Red #3: Disodium salt of 9-0-carboxyphenyl-6-hydroxy-2,4,5,7-teteraiodo-3-isoxanthone(erythrosin) from cement and similar surfaces. However, pH neutralizers can be avoided if solutions are properly balanced.

Some of the surfactants have antifreeze properties and this might cause reduction or even elimination of the need for other antifreezes.

EXAMPLE 1

A marking compositions was prepared from the following ingredients.

| Ingredient | Product 1 % by weight | Product 2 % by weight | Product 3 % by weight |
| --- | --- | --- | --- |
| $MgCl_2$ | 0% | 0% | 20% |
| NaCl | 20% | 16% | 0% |
| $CaCl_2$ | 0% | 2.8% | 0% |
| Color | .25%–3% | .5% | .5% |
| HPC | .5% | .5% | .5% |
| Talc | .5% | .5% | .5% |
| Water | Balance to 100% | Balance to 100% | Balance to 100% |

The dry ingredients were mixed with water at room temperature. The product may be produced as a liquid, as a gel, as a foam, dry or as a concentrate.

EXAMPLE 2

The cost of the composition of an orange and red colorant based on the formulation of Product 3 was calculated for the manufacture of 20,000 pounds of the color composition as follows:

| Ingredient | $/lb. | lb. RM* | Total RMC** |
| --- | --- | --- | --- |
| Water | .0015 | 15,700 | 23.55 |
| 20% $MgCl_2$ | .50 | 4,000 | 2,000.00 |
| .5% HPC | 6.40 | 100 | 640.00 |
| .5% Talc | .29 | 100 | 29.00 |
| 15% Red #3 | 31.40 | 50 | 1,570.00 |
| .15% Yellow #6 | 8.95 | 50 | 449.50 |
| | | 20,000 | 4,710.05 |

*RM = raw material
**RMC = raw material cost

From the foregoing, a cost per 8 fluid ounce container was calculated at $0.12.

EXAMPLE 3

A "kit" of four different colors was made using the following ingredients.

| Color | Percentages | Raw Material | #LBS Raw Material |
| --- | --- | --- | --- |
| | | Water | 157,425 |
| | 0.5% | HPC | 1,000 |
| | 0.5% | Talc | 1,000 |
| | 20.0% | NaCl | 40,000 |
| BLUE | 0.3% | FD&C Blue #1 | 150 |
| RED | 0.3% | FD&C Red #3 | 150 |
| GREEN | 0.21% | FD&C Yellow #5 | 105 |
| | 0.09% | FD&C Green #3 | 45 |
| YELLOW | 0.235% | FD&C Yellow #5 | 110 |
| | 0.035% | FD&C Yellow #6 | 15 |

EXAMPLE 4

The following products were prepared by mixing the ingredients listed below at room temperature:

| Product No. 1 | | |
| --- | --- | --- |
| Ingredient | Amount in Grams | Freezing Point |
| Color | 3.0 | |
| HPC | 5.0 | |
| Talc | 5.0 | (0° F.) |
| NaCl | 210.0 | |
| Water | 777.0 | |
| Total | 1,000.0 | |

| Product No. 2 | | |
| --- | --- | --- |
| Ingredient | Amount in Grams | Freezing Point |
| Color | 3.0 | |
| HPC | 5.0 | |
| Talc | 5.0 | (+10.7° F.) |
| NaCl | 160.0 | |
| Water | 827.0 | |
| Total | 1,000.0 | |

| Product No. 3 | | |
| --- | --- | --- |
| Ingredient | Amount in Grams | Freezing Point |
| Color | 5.0 | |
| HPC | 5.0 | |
| Talc | 2.5 | (−10° F.) |
| NaCl | 200 | |
| Glycerol | 200 | |
| Water | 587.5 | |
| Total | 1,000 | |

| Product No. 4 | | |
| --- | --- | --- |
| Ingredient | Amount in Grams | Freezing Point |
| Color | 5.0 | |
| HPC | 5.0 | |
| Talc | 2.5 | (−23° F.) |
| $MgCl_2$ | 210 | |
| Water | 777.5 | |
| Total | 1,000 | |

EXAMPLE 5

A "kit" of four different colors was made using the following ingredients.

| Color | Percentages | Raw Material | #LBS Raw Material |
| --- | --- | --- | --- |
| | | Water | 157,300 |
| | 0.5% | HPC (stabilizer) | 1,000 |
| | 0.5 | Talc (extender) | 1,000 |
| | 20.0% | Glycerol | 40,000 |
| Blue | 0.4% | FD&C Blue #2 | 200 |
| Red | 0.3% | FD&C Red #40 | 150 |
| Purple | 0.2% | FD&C Blue #2 | 100 |
| | 0.1% | FD&C Red #3 | 50 |
| Yellow | 0.4% | FD&C Yellow #10 | 200 |
| | | | 200,000 |

EXAMPLE 6

Samples of solutions using dextrin, linseed oil and carboxymethylcellulose (CMC) as stabilizers were prepared as follows:

Product No. 1

| Ingredient | Percentage |
| --- | --- |
| NaCl | 16.0% |
| Talc | .5% |
| Dextrin | 1.5% |
| FD&C Green #3 | .02% |
| D&C Yellow #10 | .28% |
| Water | 81.7% |
|  | 100.0% |

Product No. 2

| Ingredient | Percentage |
| --- | --- |
| NaCl | 16.0% |
| Talc | .5% |
| Linseed Oil | .5% |
| FD&C Red #40 | .3% |
| Water | 82.7% |
|  | 100.0% |

Product No. 3

| Ingredient | Percentage |
| --- | --- |
| NaCl | 15.0% |
| Glycerol | 15.0% |
| Carboxymethylcellulose | 1.0% |
| FD&C Yellow #6 | .3% |
| Talc | 1.0% |
| Water | 67.7% |
|  | 100.0% |

The washability of cement and other similar surfaces can be improved with an addition of surfactants to certain of the compositions produced according to the examples 1–6.

EXAMPLE 7

Solutions using surfactants were prepared as follows:

Product No. 1

| Ingredient | Percentages |
| --- | --- |
| HPC | .5% |
| Glycerine | 15.0% |
| Talc | .5% |
| FD&C Blue #1 | .25% |
| Duponol ME Dry | 2.0% |
| Water | 81.75% |
|  | 100.0% |

Product No. 2

| Ingredient | Percentages |
| --- | --- |
| NaCl | 5.0% |
| Glycerine | 15.0% |
| CMC | .5% |
| Talc | .5% |
| FD&C Blue #1 | .25% |
| Duponol ME Dry | 1.0% |
| Rhodacal BX-78 | 1.0% |
| Water | 76.75% |
|  | 100.0% |

Product No. 3

| Ingredient | Percentage |
| --- | --- |
| HPC | .5% |
| Talc | .5% |
| FD&C Green #1 | .3% |
| NaCl | 16.0% |
| Rhodacol BX-78 | 1.0% |
| Ivory Liquid Soad | 1.0% |
| Water | 80.7% |
|  | 100.0% |

Product No. 4

| Ingredient | Percentage |
| --- | --- |
| HPC | .5% |
| Talc | .5% |
| FD&C Blue #1 | .25% |
| Season Dish Detergent | 1.0% |
| Acanol X-10 | 1.0% |
| NaCl | 10.0% |
| Glycerine | 15.0% |
| Water | 71.75% |
|  | 100.0% |

Each solution showed improved washability from cement and other similar surfaces.

The produced colors can be easily washed out from various surfaces. For example, cement or mortar or brick or grass is product washable with a hose or rain. At the beach a bucket of water or two removes the color easily. Colors appear to come out of most clothing with normal laundring.

The product can be prepacked in spray containers, cans, jars and other containers. It can be prepared as gel, foam, concentrate or powder and prepacked accordingly in drums or other large containers. The concentrate or powder, to be mixed with water by the user, would be appropriate for large quantity applications. For small quantity applications, packets of concentrate or dry mixture may also be appropriate. The prepared product may be utilized for decorative purposes and entertainment and for marking sports fields, particularly ski, sledding and skating ones. It can also be utilized for construction sites, "SOS:—signs for skiers, hikers and climbers, for designating temporary crosswalks, for marking airport runways, for marking hazards on snow or ice, etc. In particular, the product is usable on deserts, beaches, sand and for other purposes. In particular, the salt solutions are usable for arts and crafts projects.

What is claimed is:

1. An aqueous marking composition which can be readily removed when desired from a surface of a substrate to which it is applied comprising: water; at least 1% by weight of at least one water soluble or water dispersible antifreeze agents; and at least 0.01% by weight of at least one water or alcohol soluble or water dispersible coloring agents; said marking composition being adapted to provide a colored covering for a substrate surface which can be readily removed from said substrate surface as desired.

2. The aqueous marking composition as claimed in claim 1, wherein said antifreeze agent is a water soluble salt selected from the group consisting of sodium chloride, potassium chloride, magnesium chloride, calcium chloride, sodium sulfite, sodium bicarbonate and mixtures of the same.

3. The aqueous marking composition as claimed in claim 1, wherein said antifreeze agent is a water soluble or water dispersible antifreeze agent selected from the group consisting of alcohol, a polyol, polyol fatty acid esters and mixtures of the same.

4. The aqueous marking composition as claimed in claim 1, wherein said antifreeze agent is a water soluble or a water dispersible antifreeze agent selected from the group consisting of water soluble salts, alcohol, a polyol, polyol fatty acid esters and mixtures of the same, which antifreeze agent is present in an amount up to 50% by weight.

5. The aqueous marking composition as claimed in claim 4 wherein said antifreeze agent is used in an amount sufficient to prepare an aqueous marking composition having a freezing point temperature of about 30° F. or lower.

6. The aqueous marking composition as claimed in claim 1, wherein said aqueous marking composition further comprises a water soluble or water dispersible stabilizer in an amount up to about 3% by weight.

7. The aqueous marking composition as claimed in claim 6, wherein said stabilizer is an amount up to about 0.5% by weight of hydroxypropyl cellulose.

8. The aqueous marking composition as claimed in claim 1, wherein said aqueous marking composition further comprises a water soluble or water dispersible extender in an amount up to about 3% by weight.

9. The aqueous marking composition as claimed in claim 8, wherein said extender is selected from the group consisting of talc, chalk, colored chalk, clay, starch and mixtures of the same.

10. The aqueous marking composition as claimed in claim 5, wherein said aqueous marking composition further comprises a water soluble or water dispersible stabilizer in an amount up to about 3% by weight.

11. The aqueous marking composition as claimed in claim 10, wherein said aqueous marking composition further comprises a water soluble or water dispersible extender in an amount up to about 3% by weight.

12. The aqueous marking composition as claimed in claim 11, wherein said extender is selected from the group consisting of talc, chalk, colored chalk, clay, starch and mixtures of the same.

13. A method of marking a substrate surface with a coating that is visually determinable for a desired period of time comprising: providing an aqueous coating composition which is adapted to provide a colored covering for said substrate surface and is readily removable when desired comprising water, at least 1% by weight of at least one water soluble or water dispersible antifreeze agent and from 0.01% to about 3% by weight of at least one water or alcohol soluble or water dispersible colorant; and applying said coating composition to a portion of said substrate surface to be marked.

14. The method of marking a substrate surface with a coating as claimed in claim 13, wherein said antifreeze agent is a water soluble salt selected from the group consisting of sodium chloride, potassium chloride, magnesium chloride, calcium chloride, sodium sulfite, sodium bicarbonate and mixtures of the same.

15. The method of marking a substrate surface with a coating as claimed in claim 13, wherein said antifreeze agent is a water soluble or water dispersible antifreeze agent selected from the group of alcohol, a polyol, polyol fatty acid esters and mixtures of the same.

16. The method of marking a substrate surface with a coating as claimed in claim 13, wherein said antifreeze agent is a water soluble or water dispersible antifreeze agent selected from the group consisting of water soluble salts, alcohol, a polyol, polyol fatty acid esters and mixtures of the same.

17. The method of marking a substrate surface with a coating as claimed in claim 14, wherein said aqueous coating composition further comprises a water soluble or water dispersible stabilizer in an amount up to about 3% by weight.

18. The method of marking a substrate surface with a coating as claimed in claim 16, wherein said aqueous coating composition further comprises a water soluble or water dispersible stabilizer in an amount up to about 3% by weight.

19. The method of marking a substrate surface with a coating as claimed in claim 16 wherein said aqueous coating composition further comprises a water soluble or water dispersible extender in an amount up to about 3% by weight.

20. The method of marking a substrate surface with a coating as claimed in claim 18, wherein said aqueous coating composition further comprises a water soluble or water dispersible extender in an amount up to about 3% by weight and a surfactant.

* * * * *